United States Patent [19]

Tobias

[11] Patent Number: 5,062,498
[45] Date of Patent: Nov. 5, 1991

[54] HYDROSTATIC POWER TRANSFER SYSTEM WITH ISOLATING ACCUMULATOR

[76] Inventor: Jaromir Tobias, 322 E. 57th St., New York, N.Y. 10022

[21] Appl. No.: 381,197

[22] Filed: Jul. 18, 1989

[51] Int. Cl.⁵ ................. B60K 17/356; F15B 1/02
[52] U.S. Cl. ................................. 180/308; 60/413; 60/418
[58] Field of Search ............... 180/305, 308, 165, 242; 60/413, 418

[56] References Cited

U.S. PATENT DOCUMENTS

| | | |
|---|---|---|
| 900,342 | 10/1908 | Ashley . |
| 2,240,011 | 10/1920 | Casey . |
| 2,355,357 | 8/1944 | Adams et al. . |
| 2,363,977 | 11/1944 | Kucher . |
| 2,704,131 | 3/1955 | Vahs . |
| 2,850,878 | 9/1958 | Sampietro et al. . |
| 3,709,104 | 1/1973 | Culberson . |
| 3,828,555 | 8/1974 | Capdevielle . |
| 3,886,848 | 6/1975 | Budecker et al. . |
| 3,892,283 | 7/1975 | Johnson . |
| 3,918,847 | 11/1975 | Junck et al. . |
| 3,962,872 | 6/1976 | Budzich ........................ 60/464 X |
| 3,964,260 | 6/1976 | Williams et al. . |
| 3,984,978 | 10/1976 | Alderson . |
| 4,064,694 | 12/1977 | Baudoin ......................... 60/418 X |
| 4,161,906 | 7/1979 | Tobias . |
| 4,165,677 | 8/1979 | Tobias . |
| 4,215,545 | 8/1980 | Morello et al. ................. 60/413 |
| 4,215,624 | 8/1980 | Tobias . |
| 4,227,587 | 10/1980 | Carman . |
| 4,240,515 | 12/1980 | Kirkwood . |
| 4,246,978 | 1/1981 | Schulz et al. . |
| 4,348,863 | 9/1982 | Taylor et al. ................... 60/413 X |
| 4,350,220 | 9/1982 | Carman ........................... 60/418 X |
| 4,503,928 | 3/1985 | Mallen-Herrerro et al. ..... 180/308 |
| 4,527,954 | 7/1985 | Murali et al. ................... 91/361 X |
| 4,557,678 | 12/1985 | Nishimura . |
| 4,616,478 | 10/1986 | Jensen . |
| 4,735,296 | 4/1988 | Pinson . |
| 4,741,410 | 5/1988 | Tunmore . |
| 4,752,195 | 6/1988 | Friedrich et al. . |
| 4,769,989 | 9/1988 | Ostwald et al. . |
| 4,801,245 | 1/1989 | De Haas et al. . |
| 4,888,949 | 12/1989 | Rogers . |
| 4,903,792 | 2/1990 | Ze-Ying ........................... 180/308 |

FOREIGN PATENT DOCUMENTS 3543073 6/1987 Fed. Rep. of Germany ...... 180/308

OTHER PUBLICATIONS

Shames, Irving H. *Mechanics of Fluids* 2nd ed., New York, N.Y., McGraw-Hill Book Co. 6/1982, pp. 258-260.

Primary Examiner—Edward K. Look
Assistant Examiner—George Kapsalas
Attorney, Agent, or Firm—Antonelli, Terry Stout & Kraus

[57] ABSTRACT

A hydrostatic power transfer system for transferring power from a rotating power input shaft to a rotating output shaft comprises a fluid pump driven by the power input shaft. A pump outlet supplies pressurized fluid to a pressure accumulator disposed downstream of the pump. The accumulator has an outlet for discharging fluid under pressure from the accumulator to at least one fluid motor. The accumulator includes two chambers and a pressure transmissive member separating the two chambers. The pressurized fluid from the pump is supplied to and discharged from one of the two chambers and the other chamber includes a spring cushion such as a pressurized gas acting against the pressure transmissive member for insulating the system against vibration transmission through the accumulator.

22 Claims, 2 Drawing Sheets

HYDROSTATIC POWER TRANSFER SYSTEM WITH ISOLATING ACCUMULATOR

BACKGROUND OF THE INVENTION

The present invention relates to a hydrostatic power transfer system which utilizes one or more hydraulically driven motors to drive vehicle wheels, ship turbines, or the like. Prior art arrangements have an energy source, such as an internal combustion engine, to drive a piston pump, which in turn pumps the fluid to hydraulic motors driving vehicle wheels or other power output devices, such as ship turbines and the like.

Historically known advantages suggest the use of pumps and hydraulic motors as essentially gearless infinitely variable torque/speed transmission systems for, for instance, automotive vehicles and ships. For example, one advantage is the possibility of permitting the pump to be driven by a combustion engine operating within a relatively highly efficient predetermined narrow torque-speed range with variations in the vehicle driving speed being accomplished by varying the displacement and/or speed of the pump and/or hydraulic motor or motors, rather than by varying the engine speed over a wide range. Smaller, lower horsepower rated engines, can thus be used for a given drive requirement.

Avoiding the necessity of significant acceleration and deceleration of the multiple parts of the prime mover internal combustion engine by maintaining a narrow torque-speed range results in better vehicle acceleration control by minimizing inertia effects. Also the combustion engines may be operated highly efficiently if they are permitted to operate in a pre-determined maximum efficiency ideal speed and torque range. The efficiency of gas turbine engines and reciprocating piston diesel engines can be substantially improved by operating in such predetermined ideal speed and torque ranges. Not only the efficiency as regards use of fuel, but also improvements in the reduction of the atmospheric contaminants by the exhaust gas can be achieved. Also, operation of such engines in a narrow torque/speed range substantially improves performance as regards bearing wear and the like because optimum bearing designs can be established for such ranges and stresses due to the minimization of torque fluctuations. U.S. Pat. No. 3,709,104 to Culbertson generally discusses certain of the advantages of using rotary piston pump transmission arrangements.

Reference is also made to my prior U.S. patents showing various pump configurations, namely U.S. Pat. No. 4,215,624 issued Aug. 5, 1980, U.S. Pat. No. 4,165,677 issued Aug. 28, 1979, and U.S. Pat. No. 4,161,906 issued July 24, 1979.

Although the idea of a hydrostatic transmission using piston pumps and hydraulic motors is relatively old, such as for automotive vehicles, successful commercial embodiments have yet to be developed due to various problems. One problem with using piston pumps is that there is a tendency to misalign the rotary shafts, pistons and cylinders of the pumps irrespective of various measures taken to prevent this, the transmission of varying engine torque results in undue wear on the pump assembly. Also, misalignment between pistons and cylinders results in thrust bearing wear problems. Furthermore, relatively large volume high pressure and high speed pumps are required, creating efficiency problems due to inherent low efficiency of such high pressure piston pumps. Further problems relate to non-laminar flow effects and mechanical vibration that the combustion engine driven piston pump causes in the transmission drive train.

SUMMARY OF THE INVENTION

An object of the present invention is to develop a hydrostatic transmission system which avoids the disadvantages of the prior art arrangements and provides a simple, reliable transmission arrangement which can be readily adapted to combustion engine driven motor vehicles, industrial applications such as mining, drilling, machinery operations, and the like.

Another object of certain preferred embodiments of the invention for use with combustion engine driven motor vehicles is to provide an arrangement which is of compact design and which can readily be installed in a motor vehicle environment.

These and other objects are achieved according to the invention by providing a combination power transfer system which includes a non-piston fluid pump driven by the combustion engine, a fluid pressure accumulator system which is supplied with fluid pressure by the non-piston fluid pump and the output of which provides fluid pressure for driving one or more hydraulic drive motors. By interposing the pressure accumulator between the fluid pump and the fluid drive motors, the fluid drive motors and the rest of the drive train are effectively isolated from any pulsations and turbulent flow from the pump and the vibration and the torque transferred from the engine to the pump which would be transferred to the hydraulic motors. Furthermore, the pressure accumulator can be connected with the fluid pump by small diameter fluid pressure lines which can be easily routed for relatively long distances and with paths of various shapes to the pressure accumulator which can be disposed close to the fluid motor being driven. Thus, the power transfer system can be readily adapted to motor vehicle engine environments and the like. Since the accumulator is disposed between the pump and the drive motor or drive motors, not only are the drive motors effectively isolated and cushioned with respect to pulsations at the outlet of the pump, the pump is effectively isolated from vibration from the fluid motor. The interposition of the pressure accumulator results in a driving pressure available to the motors, with minimization of turbulent flow. In the preferred embodiments of the invention, a primary function of the accumulator is to provide vibration insulation of the system components, rather than to serve only primarily as an energy storage device.

With the arrangement of the invention, the hydraulic drive motor or motors are effectively isolated from any mechanical torque and vibrations of the engine, and pulsations and turbulent flow from the pump. The accumulator substantially eliminates the transmission of any vibrations from the engine and pump to the hydraulic motors.

In especially preferred embodiments of the invention, a computer control unit is provided for controlling the valves for the hydrostatic power transfer system, including inlet and outlet valves and bypass valves. According to especially advantageous preferred embodiments for automotive vehicles, the output shafts of the hydraulic drive motor(s) are connected to the wheels by way of respective constant velocity universal joints.

In especially preferred embodiments, the pressure accumulator system interposed between the outlet of the first pump and the inlets to the hydraulic motors is constructed as a pressure accumulator with a non-piston pump, such as a vane pump, which controls the increases and decreases in the fluid pressure in the pressure accumulator. In especially preferred embodiments of the invention, the engine is operated at a predetermined speed torque range to drive the pump, and accumulator system to generate sufficient fluid pressure and volume for driving the motor or motors at their highest rated torque/speed ranges.

In especially preferred embodiments where the power transfer system is used to drive motor vehicle wheels, constant velocity U-joints are interposed between the respective fluid driving motors and driven wheels. Also, certain preferred embodiments utilize a constant velocity U-joint drive connection between the combustion engine and the non-piston pump.

In certain preferred embodiments, a controller system is provided which includes devices for sensing and automatically maintaining the fluid pressure in the fluid lines between the pump, the accumulator and a fluid reservoir. The controller system also includes devices for controlling valves in the fluid lines between the accumulator and the fluid motor or motors. The controller system for controlling the fluid motor fluid supply may be selectively operated in an "open loop" mode where the vehicle operator can change the vehicle velocity by way of an accelerator pedal or the like and a "closed loop" mode with automatic maintenance of a predetermined set vehicle speed. When operating in the closed loop automatic mode, the controller system detects the vehicle or motor output shaft speed and continuously operates the valves controlling the fluid motors to maintain the set speed.

In certain preferred embodiments, the fluid motors can be controlled by varying the position of motor vanes and/or by varying the fluid flow through the accumulator from the pump.

The system components can be selected from commercially available products, including the combustion engines, the non-piston pumps, the accumulators, the hydraulic motors, and the fluid pressure control valves.

Other objects, advantages and novel features of the present invention will become apparent from the following detailed description of certain preferred embodiments of the invention when considered in conjunction with the accompanying drawings.

DETAILED DESCRIPTION OF THE PREFERRED EMBODIMENTS

Figure 1:
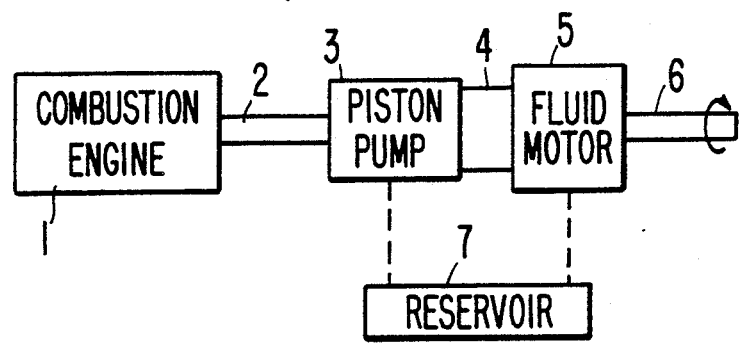
FIG. 1 is a schematic view depicting a prior art hydrostatic power transfer system.

FIG. 1 schematically depicts a prior art arrangement which includes a combustion engine 1 with an output drive shaft 2 driving a piston pump 3. A manifold valve assembly 4 controls the pressurized fluid drive of fluid motor 5 by the piston pump 3. The fluid motor 5 has a driven output shaft 6, the arrow schematically depicting the rotation thereof in the drawing figure.

A reservoir 7 is also schematically depicted for the hydraulic fluid of the pump and motor system.

A significant disadvantage of the prior art arrangement of FIG. 1 is that the fluid pressure supplied by the piston pump 3 to drive the fluid motor 5 is turbulent and thus transmits vibration effects throughout the system. Further disadvantages result due to inherent tolerance misalignments of the rotary shafts, pistons and cylinder of the piston pump. These transmission of vibration effects caused by the variable flow and the inherent tolerance problems with piston pumps reduces the efficiency power transfer from the engine 1 to the output drive shaft 6, and causes undue wear of the component parts. This prevents a smooth continuous transmission control of the driving speed of the shaft 6.

Figure 2:
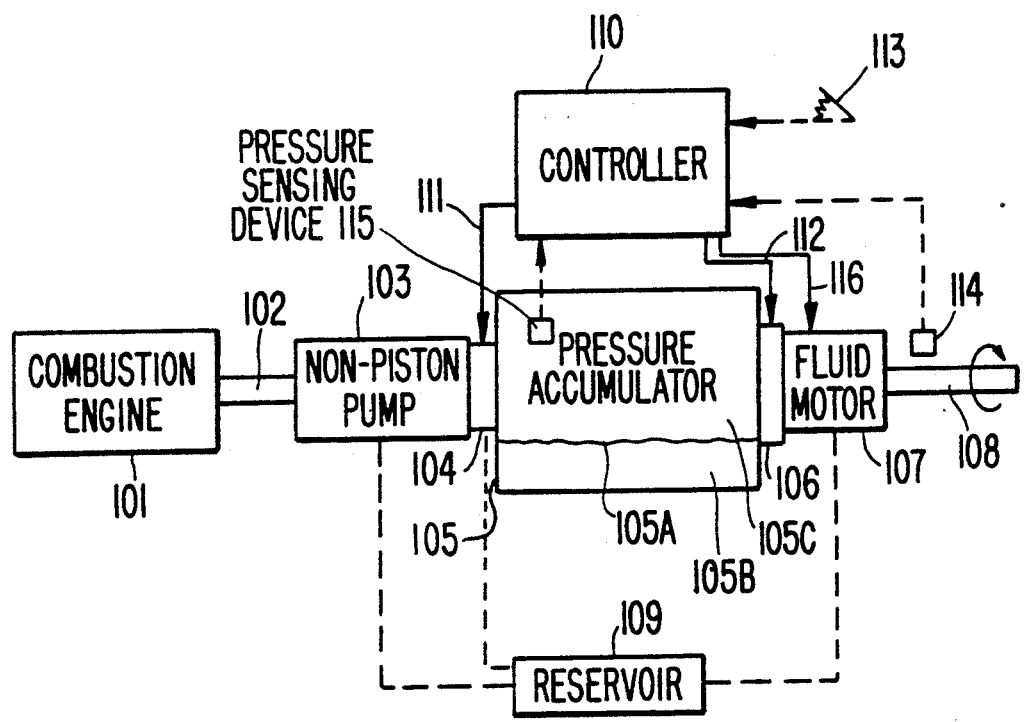
FIG. 2 is a schematic view depicting a hydrostatic power transfer system constructed in accordance with a preferred embodiment of the present invention.

FIG. 2 schematically depicts a hydrostatic power transfer system constructed in accordance with a preferred embodiment of the invention, with a combustion engine 101 and an output shaft 102 driving a non-piston pump 103 which is connected by a manifold valve 104 at the inlet side of a pressure accumulator 105. The pressure accumulator 105 is schematically depicted as including a flexible diaphram 105A separating two chambers 105C and 105B, the diaphram 105A and a fluid medium in 105B act as an effective "spring cushion" for the pressure of the driving fluid in chamber 105C. Any number of different fluid pressure accumulator constructions can be used as the pressure accumulator 105. A manifold valve 106 is disposed at the outlet side of the accumulator 105 and serves to control the fluid pressure supply to fluid motor 107, which fluid motor 107 has an output drive shaft 108. A reservoir 109 is schematically depicted for accommodating a supply of driving fluid for the hydrostatic power transfer system.

A schematically depicted controller 110 is provided for controlling the operation of the valving in the manifold valves 104 and 106 via control lines 111 and 112, respectively. The controller system further includes an input signal line from an operator controllable member 113, such as a vehicle accelerator pedal or the like; a signal line from a speed sensing device 114 for sensing the speed of shaft 108; and a signal line from a pressure sensing device 115 for sensing the pressure in the accumulator 105. This arrangement of FIG. 2 differs from the prior art arrangement of FIG. 1 in several important respects. First, the pressure accumulator 105 is interposed between the combustion engine driven pump 103 and the fluid motor 107. With this arrangement schematically depicted in FIG. 2, the pressure accumulator 105 effectively isolates the pump from the motor so that transmission of vibration forces through the system from the fluid motor 107 as well as vibration forces from the non-piston pump 103 to the fluid motor 107 are effectively avoided.

Further, the interposition of the pressure accumulator 105 minimizes transfer of engine and drive shaft vibrations and pump pulsations to the motor 107, thus minimizing vibration forces that would otherwise occur due to the therein fluctuations in fluid flow at the fluid motor.

A second significant difference between the prior art of FIG. 1 and the preferred embodiment of FIG. 2 is the inclusion of a non-piston pump 103 instead of the piston pump 3. The use of a non-piston pump minimizes pulsating outlet pressure flow into the manifold valve 104 and pressure accumulator 105, thereby further improving efficient flow of the overall drive system.

Thirdly, the system of the embodiment of FIG. 2 differs from the prior art arrangement of FIG. 1 in the provision of the controller system 110-115. In especially preferred embodiments, the controller 110 includes a programmed microprocessor which provides for continuous and rapid adjustments to changing conditions along the drive system, that is, changes in loads and velocities at the fluid motor output shaft 108, and changes in the operation of the combustion engine 101, e.g. as reflected by the position of pedal 113. In preferred embodiments where the system is used to drive motor vehicle wheels, the combustion engine 101 can be operated at a substantially constant speed, with the control of the manifold valve assemblies 104 and 106 by the controller 110 serving to assure a smooth controlled drive of the fluid motor 107. The valve manifold 106 is configured to be reversible, so as to accommodate reversing of the fluid motor drive direction. The control system for the valve manifold 106 can be operated in either an "open loop" control mode, with driver actuator member 113 serving as the input to change the fluid driving forces operating on the fluid motor 107 and an automatic "closed loop" control mode where a preset speed for shaft 108 or the like is selected and the controller 110 automatically controls the manifold valve 106 to maintain that speed.

The manifold valve 104 can be controlled in such a manner with a so-called "closed loop" configuration whereby the pressure sensor 115 is provided as an input signal to controller 110 and any deviations from a predetermined desired pressure for the accumulator are automatically accommodated for by adjustment of manifold valve 104.

Preferred embodiments of the power transfer system are contemplated wherein the fluid motor 107 includes variable parts such as variable pitch vanes, which can be controlled by the controller 110 by way of control line 116, along with the control of the manifold valve 106, to thereby precisely control the operation of the fluid motor 107.

The system of FIG. 2 can be configured to operate with the pressurized fluid in the accumulator 105 continously maintained in a sufficient supply volume and predetermined high pressure as to satisfy the expected highest demands of the fluid motor 107 during operation. With a substantially constant velocity combustion engine 101, the maintenance of the predetermined high pressure in the accumulator 105 can be effected by control of the manifold valve 104 in response to the detected actual pressure via pressure detector 115, to thereby automatically adjust to any reductions in pressure in the accumulator 105 due to the demands of the fluid motor driving system. That is, where the engine 101, and thereby the pump 103, are operated at a substantially constant speed, the valve 104 opens or closes the flow of pressurized fluid to the accumulator 105 to maintain the predetermined pressure and necessary flow volume in accumulator 105. When the flow from the pump to the accumulator is stopped by the valve 104, with the continued operation of the pump 103 by the substantially constant speed driven engine 101, the manifold valve 104 bypasses the output of the pump 103 directly to the reservoir 109 as illustrated by the dashed line in FIG. 2. With such an operational arrangement, the fluid motor 107 effectively receives a smooth flow of constant pressure from the driving fluid source which can be smoothly and reliably controlled in response to the system needs.

In the drawing figures, the combustion engine 101 has been indicated as directly connecting with non-piston pump 103 by drive shaft 102. It will be understood that with certain engines, a fly wheel would be interposed in the driving connection depicted by the shaft 102. However, it is noted that embodiments are contemplated with other than combustion engine power sources, such as water powered turbines and the like, where such a fly wheel may be dispensed with. It should be further understood that although the preferred embodiments described herein relate primarily to motor vehicle drive systems, the invention is not limited to motor vehicles, but can also be used in other environments where power is to be transmitted from a power source to an output drive shaft of a fluid motor.

Figure 3:
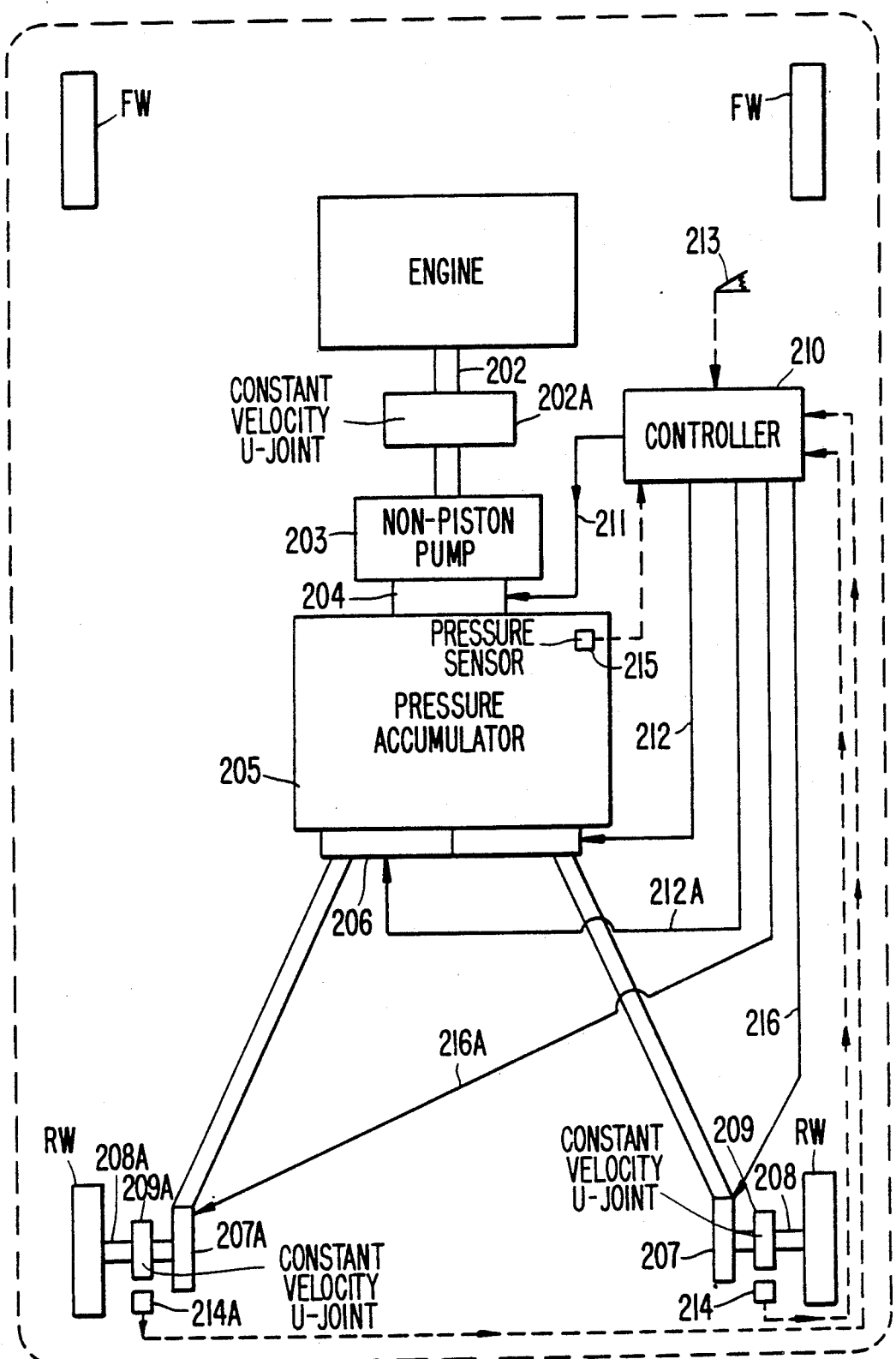
FIG. 3 is a schematic view of a preferred embodiment of a hydrostatic power transfer system constructed according to the present invention, installed on a motor vehicle.

FIG. 3 schematically depicts a preferred embodiment of the present invention adapted for driving a motor vehicle, with the motor vehicle MV depicted only in outline form and including the front wheels FW which are not driven and driven rear wheels RW. An engine 201 drives a non-piston pump 203 with interposition of a drive shaft 202 and constant velocity U-joint 202A. The non-piston pump 203 is fluidly connected by a manifold valve assembly 204 with pressure accumulator 205. The pressure accumulator 205 is in turn fluidly connected with a manifold valve assembly 206 which is interposed between the accumulator 206 and a pair of driving motors 207 and 207A. The motors in turn have output shafts 208 and 208A which are drivingly connected to drive the respective rear wheels with interposition of respective constant velocity U-joints 209 and 209A. Vehicle wheel speed detectors 214 and 214A are mounted adjacent the rear wheels RW to detect the respective wheel speed and provide an input signal indicating same to the controller 210. The controller 210 includes output control signal lines 211 and 212 for respectively controlling the manifold valves 204 and 206, analogously to that described above with respect to the control of the system of FIG. 2. The pressure accumulator also includes a pressure sensor 215 which provides an input signal to the controller 210 indicating the detected pressure. Lastly, a reservoir is also provided which is not shown, analogous to the reservoir 109 of FIG. 2.

The FIG. 3 arrangement operates substantially in the same manner as the arrangement of FIG. 2 described above, except that, instead of a single drive motor 107, a pair of drive motors 207 and 207A are provided which are independently and separately controllable. For this purpose, the controller includes two control lines 212 and 212A for controlling the fluid supply to the motors 207 and 207A independently of one another. The manifold valve 206 is configured to accommodate the separate control. Control lines 216 and 261A are for controlling the variable hydraulic motors 207 and 207A, respectively. As in the FIG. 2 embodiment, a vehicle accelerator pedal 213 is provided for the vehicle operator.

In the embodiment of FIG. 3, the front wheels FW are indicated as not being driven. However, four-wheel drive embodiments are also contemplated where the output from the pressure accumulator would then be provided to corresponding manifold valves and motors for driving these other wheels.

In the embodiments contemplated for driving a motor vehicle, the pump and pressure accumulator assembly is designed to produce available pressure of in the range of 5,000 pounds per square inch fluid pressure, with sufficient volume to supply the motors for driving the vehicle wheels overall expected operating conditions.

Other embodiments, not shown, are contemplated wherein the accumulator includes a plurality of separate series arranged accumulators which progressively increase the pressure in the fluid. Also embodiments, not shown, are contemplated with parallel arranged accumulators at different pressures. With the parallel arrangement the valve manifolds and controller system operate to selectively use and mix the output of the multiple accumulators to provide the desired fluid motor driving fluid pressure.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A hydrostatic power transfer system for transferring power from a rotating power input shaft to a rotating output shaft, comprising:

fluid pump means driven by a power input shaft and including means for supplying pressurized fluid to a pump outlet means, pressure accumulator means disposed downstream of the pump means and having respective accumulator inlet means for accepting pressurized fluid from the pump outlet means and accumulator outlet means for discharging fluid under pressure from the accumulator means, said accumulator means including two chambers and pressure transmissive means separating said two chambers, the pressurized fluid from said fluid pump means being supplied to one of the two chambers and the other chamber including spring cushion means for acting against said pressurized fluid in said one chamber via said pressure transmissive means for insulating the system against vibration transmission through the accumulator means and fluid motor means downstream of the pressure accumulator means and driven by fluid from the accumulator outlet means whereby said pressure accumulator means is interposed in series between said fluid pump means and the fluid motor means so that it substantially eliminates transmission of vibrations from the fluid pump means to the fluid motor means, said fluid motor means being drivingly connectable to a rotating output shaft.

2. A power transfer system according to claim 1, wherein the fluid pump means is a non-piston pump.

3. A power transfer system according to claim 2, wherein the non-piston pump is a vane pump.

4. A power transfer system according to claim 1, wherein said power input shaft is a combustion engine driven shaft.

5. A power transfer system according to claim 3, wherein said power input shaft is a combustion engine driven shaft.

6. A power transfer system according to claim 1, wherein constant velocity U-joint means are interposed between the power input shaft and the fluid pump means.

7. A power transfer system according to claim 6, wherein constant velocity U-joint means are interposed between the rotating output shaft and the fluid motor means.

8. A power transfer system according to claim 1, wherein constant velocity U-joint means are interposed between the rotating output shaft and the fluid motor means.

9. A power transfer system according to claim 1, wherein said accumulator inlet means includes at least part of a pump outlet manifold valve means, further comprising controller means for automatically controlling said pump outlet manifold valve means as a function of pressure in the accumulator means.

10. A power transfer system according to claim 9, wherein said accumulator outlet means is an accumulator outlet manifold valve means, wherein said controller means includes means for automatically controlling said accumulator outlet manifold valve means as a function of an operating condition of said fluid motor means.

11. A power transfer system according to claim 10, wherein said operating condition is the velocity of the output shaft.

12. A power transfer system according to claim 11, wherein said operating condition is the torque being transmitted by the output shaft.

13. A power transfer system according to claim 9, wherein said controller means includes a microprocessor for determining a desired adjustment of the pump outlet valve means as a predetermined function of the pressure in the accumulator means.

14. A power transfer system according to claim 13, wherein said accumulator outlet means is an accumulator outlet manifold valve means, wherein said controller means includes means for automatically controlling said accumulator outlet manifold valve means as a function of an operating condition of said fluid motor means.

15. A power transfer system according to claim 14, wherein said accumulator outlet manifold valve means is operable to selectively reverse the operating direction of said fluid motor means.

16. A power transfer system according to claim 1, wherein said pressurized fluid is a hydraulic fluid.

17. A power transfer system according to claim 1, wherein said power transfer system is interposed between internal combustion engine means at a vehicle and driven wheel means of said vehicle.

18. A power transfer system according to claim 17, wherein means are provided for operating said combustion engine means at a constant velocity corresponding to its optimum efficiency and power output, and wherein variations in speed of the vehicle are effected exclusively by changes in fluid pressure supplied to the motor means by way of the accumulator means.

19. A power transfer system according to claim 18, wherein said accumulator inlet means includes at least part of a pump outlet manifold valve means further comprising controller means for automatically controlling said pump outlet manifold valve means as a function of pressure in the accumulator means.

20. A power transfer system according to claim 19, wherein said accumulator outlet means is an accumulator outlet manifold valve means, wherein said controller means includes means for automatically controlling said accumulator outlet manifold valve means as a function of an operating condition of said hydraulic motor means.

21. A power transfer system according to claim 20, wherein said operating condition is the velocity of the output shaft.

22. A power transfer system according to claim 21, wherein said motor means includes a plurality of separate motors for separately driving respective driven wheels of said vehicle, and wherein said controller means includes means for automatically separately controlling the supply of fluid to the respective motors in response to the respective velocity of the wheel being driven thereby.

* * * * *